April 18, 1933. H. R. BRAND 1,904,198
DISH HANDLING MECHANISM
Filed July 3, 1930 2 Sheets-Sheet 1

INVENTOR
H. R. BRAND
BY *[signature]*
ATTORNEY

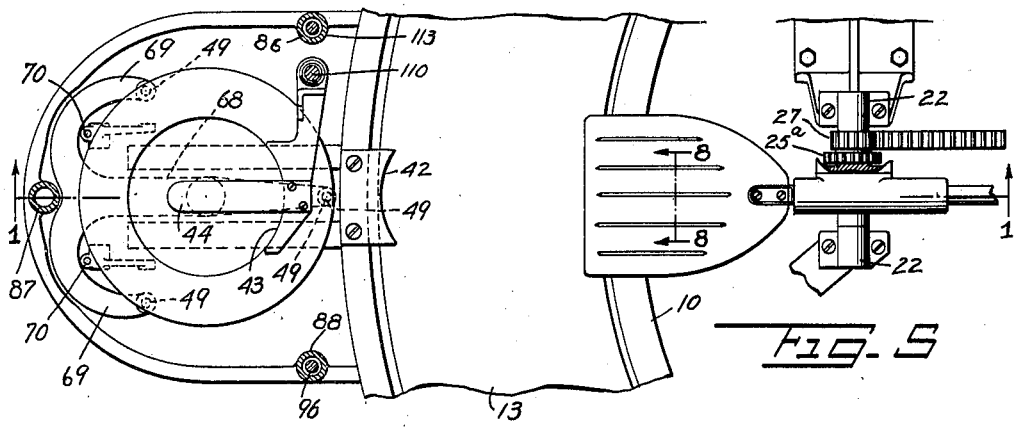
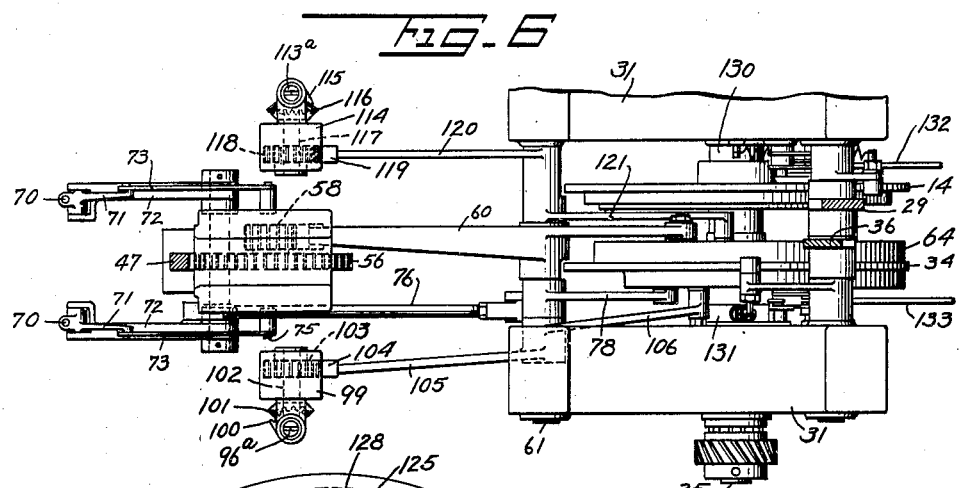
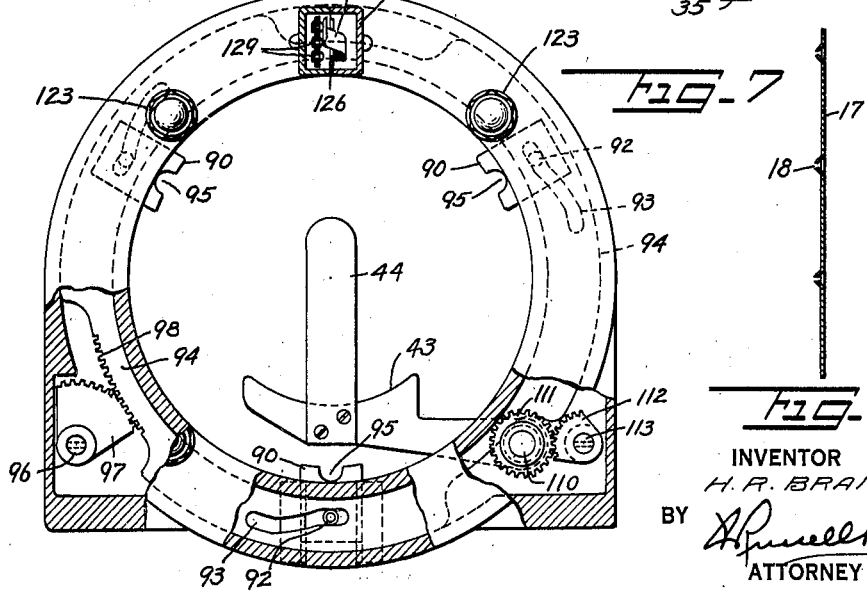

Patented Apr. 18, 1933

1,904,198

UNITED STATES PATENT OFFICE

HARRY RUSSELL BRAND, OF NEW YORK, N. Y.

DISH HANDLING MECHANISM

Application filed July 3, 1930. Serial No. 465,755.

The present invention relates to mechanism for handling dishes, trays or other commodity receptacles, which will hereinafter be generically referred to as "dishes".

An object of the invention is to provide means for automatically withdrawing a dish from a magazine and moving it into position to receive a commodity.

The invention is adapted for use in connection with a commodity dispensing apparatus, and an object of the invention is to provide means for operating the dish handling mechanism in timed relation to the dispensing apparatus, whereby a dish will be withdrawn from commodity receiving position after a predetermined operation of the dispensing apparatus and be automatically replaced with another dish.

Another object of the invention is to provide a magazine in which a plurality of dishes may be stacked, with means for withdrawing one dish at a time from the bottom of the stack and conveying it to commodity receiving position.

My invention is particularly adapted for use with automatic food preparing apparatus and has for an object to provide automatic means for bringing a dish into position to receive food from said apparatus, withdrawing the dish after a predetermined quantity of food has been deposited thereon, and replacing the dish with another.

In my copending application Serial No. 268,659, filed April 9, 1928, I describe an apparatus for baking griddle cakes and the like, with automatic means for supplying plates to receive the griddle cakes as baked. The present invention is in part a division and in part a continuation of said application.

Other objects of my invention will appear in the following description of a preferred embodiment and thereafter the novelty and scope of the invention will be pointed out in the claims.

In the accompanying drawings:

Fig. 5 is a plan view in section, taken on the line 5—5 of Fig. 1;

Fig. 6 is a view in section taken on the line 6—6 of Fig. 1;

Fig. 7 is a view in section, on an enlarged scale, taken on the line 7—7 of Fig. 1, but turned clockwise through an angle of 90°, certain parts being broken away to reveal details on a lower plane; and Fig. 8 is a fragmental view in transverse section, but on an enlarged scale, of a peel used in the machine, the section being taken on the line 8—8 of Fig. 5.

In general the drawings illustrate a portion of a griddle-cake baking machine with a magazine in which a stack of dishes is mounted and from which the dishes are withdrawn one at a time and moved to position to receive cakes removed from the griddle by means of a peel. A portion of the main frame of the griddle-cake baking machine is indicated at 10. On this frame is mounted an annular casing 11, which is formed in its upper face with an annular recess 12. This recess constitutes a heating chamber and is provided with suitable heating units (not shown) for heating a griddle 13. The griddle 13 is of annular form, substantially closing the top of the annular recess, and is supported on rollers 14 mounted in the recess 12. Means not shown are provided for rotating the griddle. The construction so far described, is shown in greater detail in my prior Patents Numbers 1,795,828 and 1,848,104.

Figure 1:
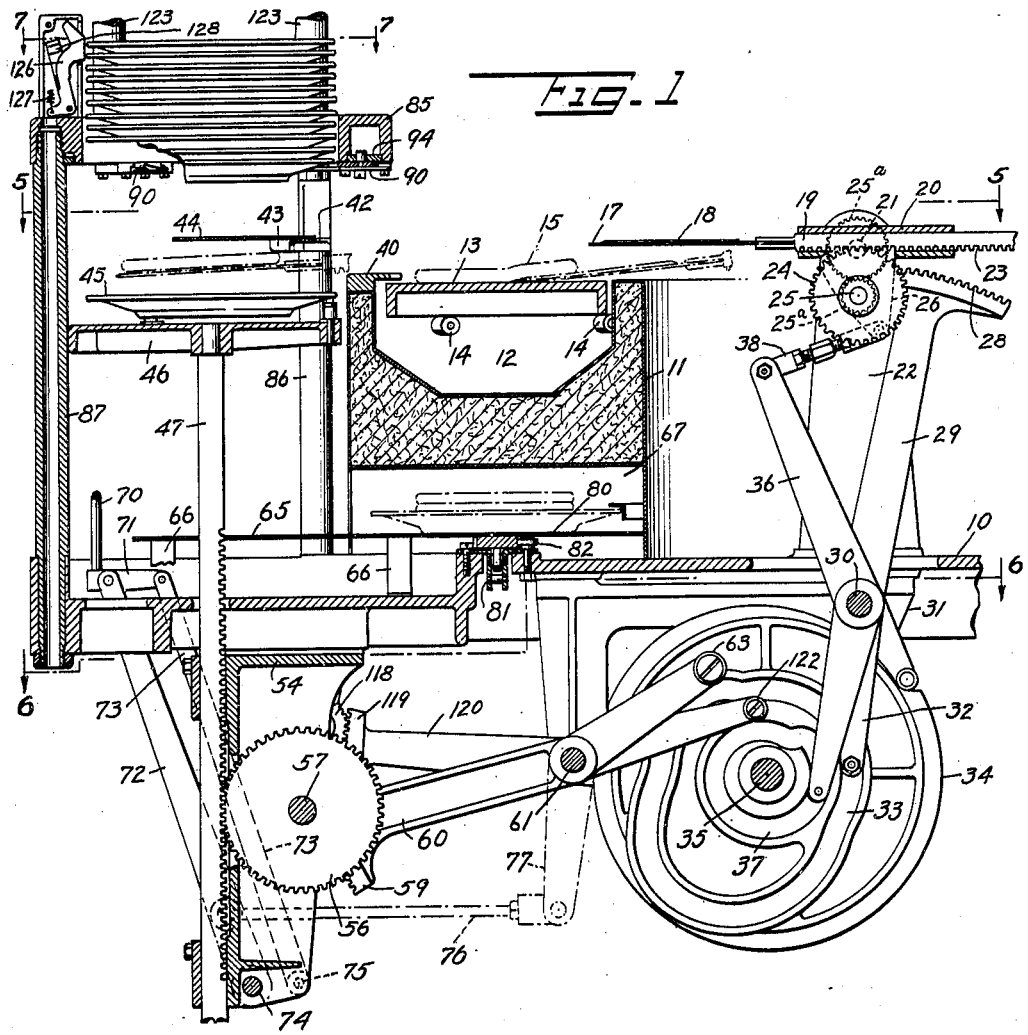
Figure 1 is a view in section of a portion of a cake baking machine provided with my improved dish handling mechanism, the section being taken substantially on the line 1—1 of Fig. 5.

As indicated in Fig. 1, the griddle cakes 15 are peeled off the griddle by a peel 17. The latter consists of a flexible sheet of metal preferably formed with longitudinal grooves 18, the margins of the grooves being upset, as clearly shown in Fig. 8, to form ribs on which the cake 15 will ride, thus reducing friction between the peel and the cake. The metal sheet 17 is fixed to a stem 19 which is slidable in a sleeve 20. This sleeve is formed with trunnions 21 which are journaled in brackets 22 rising from the base plate 10.

The stem 19 is formed at its under side with rack teeth 23 adapted to be engaged by a driving pinion 24. The latter is fixed to a shaft 25 journaled in a depending extension 26 of the sleeve 20, and is connected by a train of gears 25a to a pinion 27 which is engaged by a toothed segment 28 carried by an arm of a lever 29. This lever is fulcrumed on a fixed shaft 30 supported by a pair of brackets 31 depending from the base plate 10. The lever 29 has a depending arm 32 which engages a cam groove 33 in a cam wheel 34. The latter is mounted to rotate on a shaft 35 journaled in the brackets 31.

Also fulcrumed on the shaft 30 is a lever 36, one arm of which engages a cam groove 37 in the cam wheel 34, while the other arm is connected by a link 38 to the extension 26 of the sleeve 20. Thus, by rotation of the cam 34 the stem 19 of the peel may be advanced and retracted in the sleeve 20 and at the same time the peel may be swung on the trunnions 21 as an axis so as to bring it into engagement with the griddle 13 to peel off a cake.

The operation of this mechanism is as follows: Starting from the normal position shown in full lines in Fig. 1, the peel is first swung downward into contact with the griddle 13 and then is advanced to peel a cake 15 off the griddle. A stop 40 prevents the cake from being pushed bodily off the griddle as the peel is advanced. The peel passes under this stop slightly and then is withdrawn and tilted upward to clear the stop after which it is advanced clear of the griddle to the position shown in broken lines at the extreme left of the figure. The cake is then removed from the peel by a scraper 42. The cake is carried under the scraper past a shoulder 43 and then is raised to such position that when the peel is withdrawn the cake will engage the shoulder and be slid off the peel. A finger 44 projecting from the scraper engages the top of the cake and serves to prevent the cake from curling up as it is being scraped off the peel.

When the cake is scraped off the peel it drops upon a dish 45 supported on a dish carrier. This carrier consists of a head 46 mounted on a vertical stem 47. The head is provided with pins 49 adapted to engage the rim of the dish 45. The pins 49 are preferably rubber tipped. The stem 47 of the carrier is arranged to slide vertically in ways formed in a bracket 54 depending from the main frame 10.

The stem 47 is formed with rack teeth which mesh with a gear 56. This gear is mounted on a shaft 57 journaled in the bracket 54 and fixed to move with the gear 57 is a pinion 58 which is engaged by a toothed sector 59 on one arm of the lever 60. The latter is journaled on a fixed shaft 61 carried by the brackets 31 and the other arm of the lever 60 is provided with a roller 63 adapted to engage a cam groove in the inner face of a cam wheel 64, which is journaled on the shaft 35 (see Fig. 6). Thus, under control of the cam 64 the dish carrier may be raised or lowered.

As shown particularly in Figs. 1 and 5, a pair of stripper plates 65 are provided upon which the dish is deposited when the carrier is moved down below them. These stripper plates are supported on brackets 66 rising from the frame 10 and they lead into a chamber 67 formed in the bottom of the casing 11. This chamber is of annular form extending throughout the circumference of the casing 11, and serves as a storage space for orders of cakes.

Means are provided for moving the dishes into this storage chamber when they have been stripped off by the plates 65. As indicated particularly in Fig. 6, the head 46 is formed somewhat like an anchor, comprising a stem portion 68 and a pair of laterally curved prongs 69. The pins 49 are located at the end of each prong and at the free end of the stem portion 68. The stem 68 is narrow enough to clear the stripper plate 65 so that the head can pass below the stripper plates to deposit the dish 45 thereon. The reason for the curvature of the prongs 69 is to clear a pair of pins 70 by which the dish is pushed along the stripper plate 65 and into the chamber 67. Thus, when the carrier reaches the bottom of its stroke, the pins 49 will clear the bottom of the dish 45 and the pins 70 will project between the dish 45 and the prongs 69.

Each pin 70 is mounted on a head 71, which is supported by a pair of parallel links 72 and 73 respectively. The links 72 are fixed at their lower ends to a transverse shaft 74 journaled in the bracket 54, while each link 73 is journaled upon a pin 75 adjacent the shaft 74. A link 76 is connected at one end to one of the links 72, as shown in full lines in Fig. 6, and in broken lines in Fig. 1, while the opposite end of the link 76 has pivotal connection with one arm 77 of a bell crank journaled on the shaft 61. The other arm 78 of the bell crank carries a roller which engages a cam groove in the outer face of the cam wheel 64. Thus, under control of the cam wheel 64 a dish is lowered from the receiving position shown in Fig. 1, and deposited upon the stripper plate 65, after which the pins 70 are operated to slide the plate into the chamber 67. Thereupon the carrier rises to bring another dish into receiving position while the pins 70 are returning to normal position.

Within the chamber 67 there is an annular conveyor plate 80 supported on rollers 81 which turn on horizontal axes, and on rollers 82 which turn on vertical axes. This conveyor plate is driven by suitable means not shown and serves to convey the dishes deposited thereon by the pins 70 through the chamber 67 to a suitable delivery point. Mounted above the dish carrier 46 is a magazine adapted to contain a stack of dishes. This magazine comprises an annular base plate 85 supported on tubular vertical columns 86, 87 and 88. The inner diameter of the annular base plate 85 is somewhat greater than the diameter of the dishes which are stacked in the magazine, so that the dishes can readily pass therethrough. However, the stack of dishes is normally supported by three fingers 90 which project into the opening in the base plate and engage the rim of the bottom dish of the stack. These fingers may be withdrawn to release a plate from the stack. To this end each finger 90 is slidable in radial ways formed upon the bottom of the base plate 85. Each finger 90 is provided with a roller 92 adapted to engage a cam groove 93 in an annular cam plate 94. The latter is mounted in an annular socket in the bottom of the base plate and is adapted to rotate through a small angle. When the cam plate is in the normal position shown in Fig. 7, the fingers 90 are in their projected position and are adapted to support the stack of dishes. When, however, the cam plate is rotated counterclockwise, as viewed in Fig. 7, the fingers 90 will be withdrawn by engagement of the rollers 92 with the cam grooves 93.

The fingers 90 are located respectively directly above the pins 49 and each finger is formed with a recess 95 at its projecting end, so that the pins 49 may rise through said recesses and engage the rim of the bottom plate of the stack, taking the load of the stack off the fingers 90. This occurs when the dish carrier is at the end of its upward stroke. The cam plate 94 is then turned to withdraw the fingers, so that as the dish carrier is lowered, the stack of plates will ride down with the carrier until the rim of the bottom dish drops below the fingers 90. Thereupon the plate 94 is returned to its normal position projecting the fingers 90 under the rim of the dish next below said bottom dish.

The means for turning the cam plate 94 is as follows: Within the hollow shaft 88 there is a vertical shaft 96 which at its upper end carries a toothed sector 97. The latter engages teeth 98 formed on a portion of the cam plate 94. The lower end of the shaft 96 is coupled to a stem 96a which is journaled in a bracket 99 and carries a bevel-toothed sector 100 in mesh with a bevel pinion 101. The bevel pinion is fixed upon a transverse shaft 102 journaled in the bracket 99 and has fixed thereon a pinion 103 in mesh with a toothed sector 104 on one arm of a lever 105. This lever is fulcrumed on the shaft 61 and the other arm 106 of said lever carries a roller which engages a cam groove in the outer face of the cam wheel 64. Thus, under control of the cam wheel 64, the shaft 96 will be turned, causing the cam plate to rotate through an angle sufficient to withdraw the fingers 90 after which the cam will cause the fingers to return to their normal position, all in timed relation to the movement of the dish carrier.

Figure 2:
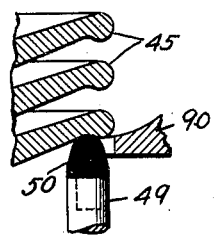
Figs. 2 to 4 are fragmental detail views showing respectively, successive steps in the withdrawal of a dish from the bottom of a stack.
Figure 3:
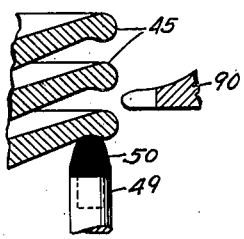
Figure 4:
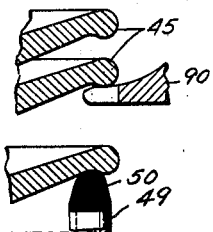

As shown in Figs. 2 to 4 inclusive, the fingers 90 are formed with rounded edges adapted to wedge their way between the rims of the dishes in the stack. A feature of my invention is the fact that the dishes are supported at three points only and the points of support are at the rim of the bottom dish. This takes care of dishes which may be considerably warped, because the pins 49 rise within the points of support provided by the fingers 90 and will relieve said fingers of the weight of the stack regardless of whether the dishes are badly warped. Furthermore, the dishes are provided with rounded rims and even then the dishes may be so warped that the rim of the bottom dish will contact with the rim of the next dish above, the rounded edge of the finger 90 will force its way between the contacting rims on the return stroke of said fingers.

When the dish carrier rises to withdraw a dish from the stack, the scraper 42 and finger 44 must be swung out of the way and held in such position until the carrier has returned to the normal position shown in Fig. 1. The scraper 42 is mounted on a shaft 110 depending from the magazine base plate 85. The shaft 110 projects into a chamber in said base plate and fixed upon the projecting end of the shaft is a pinion 111 which meshes with a toothed sector 112 fixed upon the upper end of a shaft 113. The shaft 113 extends through the hollow column 86 and is coupled at its lower end to a stem 113a journaled in a bracket 114 depending from the base plate 10. The stem 113a carries a bevel-toothed sector 115 which meshes with a bevel pinion 116 fixed upon a transverse shaft 117 journaled in the bracket 114. Also fixed on the shaft 117 is a pinion 118 which meshes with a toothed sector 119 on one arm 120 of a lever journaled on the shaft 61. The other arm 121 of this lever, as shown in Fig. 1, is provided with a roller which engages a cam groove formed in the inner face of the cam 64. Thus, the cam 64 operates through the mechanism just described to rotate the shaft 110 and thereby swing the scraper 42 and finger 44 clear of the path of the dish carrier when the latter rises to withdraw a dish from the magazine and returns to commodity receiving position.

Rising from the base plate 85 of the magazine are four columns 123 which serve to retain the dishes in the stack and prevent them from toppling over. At one side of the base plate 85 is a casing 125 in which is mounted a feeler arm 126. The latter is normally pressed by a spring 127 into engagement with the stack of dishes. Carried by the feeler arm 126 is a switch arm 128 which is adapted to swing over a set of contact buttons 129. In the normal position shown in Fig. 1, the switch arm 128 bridges a live contact button and a neutral button. When the supply of dishes in the stack falls below a predetermined number, the stack will clear the feeler arm, permitting the latter to swing outward from the casing 125 and this will cause the switch arm 128 to bridge a pair of live contact buttons 129, thereby completing an electric circuit to a suitable indicator or annunciator, which will advise that it is time to replenish the magazine.

The shaft 35 is connected with a source of power, so that it is constantly rotating in timed relation to the rotation of the griddle 13. The cams 34 and 64, however, are normally idle and operate only when there are cakes to be delivered. To this end, the cam 34 is provided with a clutch mechanism of any suitable form and generally indicated at 130, while the cam 64 is similarly provided with a clutch indicated at 131. Each clutch is of the type which when actuated will remain in engaging position until the cam makes one complete rotation and will then automatically disconnect the cam from the shaft 35. An operating link 132 is provided to throw the clutch 130 into engagement and a link 133 is arranged to throw the clutch 131 into engaging position. The clutches, however, although separately operable, are arranged to engage with the shaft 35 when the latter is in a particular angular position so that the cam 64 will always operate in a definite angular relation to the cam 34. The mechanism for operating the clutches 130 and 131 may be of the type shown in my prior Patent Number 1,869,540, the arrangement being such that the cam 34 will not operate until there is a cake in position to be removed from the griddle, and the cam 64, on the other hand, will not operate until a predetermined number of cakes have been peeled from the griddle and deposited on the dish 45. This mechanism, however, forms no part of the present invention and hence is not here shown.

The operation of the mechanism will now be reviewed. When a cake 15 comes into position before the peel 17 the clutch link 132 is operated to start rotation of the cam 34. Under control of this cam the peel 17 first moves down into engagement with the griddle 113 and then advances to peel off the cake pushing the latter against the fixed stop 40 and after the peel has advanced to a definite position under the stop 40 it is retracted slightly to clear said stop and then is advanced again until the cake clears the shoulder 43. The peel then rises so that the shoulder 43 will engage the cake, after which the peel is withdrawn to the position shown in Fig. 1, and the cake, being scraped off against the shoulder 43 drops upon the dish 45. After a certain number of operations of the peel 17, i. e., after a predetermined number of cakes 15 have been deposited upon the dish, the clutch link 133 is operated to start the rotation of cam 34. The latter causes the dish carrier to move downward, depositing the dish on the stripper plates 65 and further movement of the cam 64 causes the pins 70 to slide the dish into the chamber 67. Thereupon the pins return to normal position and the carrier is raised until the pins 49 thereon engage the rim of the bottom dish in the stack, as shown in Fig. 2. The fingers 90 are now withdrawn by a partial rotation of the annular cam plate 94 and the carrier starts downward with the stack of dishes. As soon as the rim of the bottom dish clears the fingers 90, as shown in Fig. 3, said fingers are projected under the rim of the next dish above the bottom dish, supporting the stack, as shown in Fig. 4, while the dish carried by the pins 49 proceeds downward to the receiving position shown in Fig. 1. The cam 14 is then declutched and the dish remains at the receiving position until another order of cakes has been delivered by the peel 17. In the meantime, while the carrier was rising to withdraw a dish from the stack, the cam 64 swung the scraper 42 and finger 44 clear of the dish carrier and as soon as the dish carrier cleared the stripper on its downward stroke the latter was returned to its normal position.

While I have described a preferred embodiment of my invention, it will be understood that the invention is not limited to the particular structure shown in the illustrations, but that I am at liberty to make such changes in form, arrangement, construction and operation of parts as fall within the spirit and scope of the following claims. I also wish it to be understood that while I have described the dish-handling mechanism in connection with a griddle-cake baking machine, it will be obvious that the invention is applicable not only to other cooking machines but also to commodity dispensing apparatus of entirely different character.

I claim:

1. In combination with a commodity dispensing mechanism, a support for a stack of dishes, means for withdrawing a dish from the bottom of the stack, a vertically reciprocable carrier adapted to convey said dish to a position to receive a commodity from said dispensing mechanism, and means operating thereafter to remove the dish from said carrier.

2. In combination with a commodity dispensing machine, a carrier normally supporting a dish in position to receive a commodity from said machine, means for reciprocating the carrier vertically, a support on which the dish is deposited when the carrier is lowered, and means for sliding the dish along the support and clear of the carrier, said means being adapted to operate in timed relation to the operation of the dispensing machine.

3. In combination with a commodity dispensing mechanism, a support for a stack of dishes, means for withdrawing a dish from the bottom of the stack, a carrier, means for operating the carrier to convey said dish from the stack to a commodity receiving position and thence to a transfer position and for thereafter returning the carrier to the stack, a support at the transfer position on which the dish is deposited, and means at the transfer position for moving the dish clear of the path of movement of the carrier.

4. In a dish handling machine, a plurality of fingers adapted to support a stack of dishes, a carrier vertically reciprocable to and from supporting engagement with said stack, and means operating in timed relation to the reciprocation of the carrier for withdrawing the fingers from supporting position when the carrier engages said stack and for reinserting the fingers into the next dish of the stack when the stack has been lowered by the carrier sufficiently for the bottom dish of the stack to clear said fingers.

5. In a dish handling machine, a support for a stack of dishes and comprising three fingers normally engaging the rim of the bottom dish of the stack, a carrier comprising three pins adapted to engage said bottom dish adjacent said fingers, means for reciprocating the carrier vertically toward and from the stack, and means operating in timed relation with the movement of the carrier for withdrawing the fingers from supporting position when said pins engage the bottom plate and for returning the fingers to supporting position after the stack has been lowered by the carrier sufficiently for said bottom dish to clear said fingers.

6. In a dish handling machine, a support for a stack of dishes comprising three fingers normally engaging the rim of the bottom dish of the stack, each finger being formed with a recess, a carrier comprising three pins, means for raising and lowering the carrier, said pins being positioned to enter the recesses in the fingers to support the stack when the carrier is raised, and means operating in timed relation to the movement of the carrier for withdrawing the fingers when the pins support the stack and for inserting the fingers between the bottom dish and the dish next above.

7. In a machine for handling dishes, each dish being formed with a rounded rim, a support for a stack of dishes comprising three fingers normally engaging the rim of the bottom dish of the stack, each finger having a rounded edge with a transverse recess in said edge, a carrier comprising three pins, means for raising and lowering the carrier, said pins being positioned to enter the recesses in the fingers to support the stack when the carrier is raised, and means operating in timed relation to the movement of the carrier for withdrawing the fingers when the pins support the stack and for inserting the rounded edges of the fingers between the rim of the bottom dish and the dish next above.

8. In a dish handling machine, a magazine for a stack of dishes, said magazine comprising an annular base through which the dishes may pass, fingers radially slidable in said base and normally projecting to support the dishes, a cam ring mounted to oscillate in the base and having pin-and-slot connection with the fingers to retract and project the same, a vertically reciprocable carrier adapted when raised to support the stack, and means for operating the carrier and the cam ring in mutually timed relation whereby the fingers will be retracted when the stack is supported by the carrier and will be projected when the carrier has been lowered sufficiently for the rim of the bottom plate of the stack to clear the fingers.

9. In combination with a dispensing machine having a device movable to deliver a commodity, a scraper against which the commodity is scraped off said device, a carrier adapted to support a dish in position to receive said commodity, a stack of dishes above the scraper, means for moving the carrier to and from the stack, means cooperating with the carrier for withdrawing a dish from the stack, and means for withdrawing the scraper from the path of the carrier, all of said means being adapted to operate in mutually timed relation.

10. In combination with a commodity dispensing machine, a support for a stack of dishes, a carrier reciprocable between the stack and a transfer position, means for releasing a dish from the bottom of the stack upon the carrier at each reciprocation thereof, means at a position intermediate between the stack and the transfer position for depositing a commodity on the dish, and means at the transfer position for removing the dish from the carrier.

11. In combination, a support for a stack of dishes, a carrier reciprocable between the stack and a transfer position, means for releasing a dish from the bottom of the stack upon the carrier at each reciprocation thereof, a commodity dispensing machine for depositing a commodity on the dish at a position intermediate between the stack and the transfer position, means operable in timed relation to the operation of the dispensing machine for arresting the carrier in commodity receiving position, and means at the transfer position for removing the dish from the carrier.

12. In combination, a support for a stack of dishes, a carrier reciprocable between the stack and a transfer position, means for releasing a dish from the bottom of the stack upon the carrier at each reciprocation thereof, a commodity dispensing machine for depositing a commodity on the dish at a position intermediate between the stack and the transfer position, means operable in timed relation to the dispensing machine for arresting the carrier in commodity receiving position on its advance toward the transfer position but not on its return toward the stack, and means at the transfer position for removing the dish from the carrier.

In testimony whereof, I have signed this specification.

HARRY RUSSELL BRAND.